United States Patent [19]
Ootsuji et al.

[11] 3,868,436
[45] Feb. 25, 1975

[54] PRODUCTION OF ELECTRICAL CONDUCTORS COVERED WITH CROSSLINKED MATERIAL

[75] Inventors: Masaaki Ootsuji, Osaka; Masatake Matsui, Amagasaki; Masaru Fuwa; Kiyoshi Takahashi, both of Ami-Machi, all of Japan

[73] Assignees: Mitsubishi Petrochemical Co. Ltd., Tokyo-to; Dainichi Nihon Densen Kabushiki Kaisha, Amagaski-shi-Hyoto-ken, Japan; part interest to each

[22] Filed: Dec. 15, 1972

[21] Appl. No.: 315,556

[30] Foreign Application Priority Data
Dec. 17, 1971   Japan............................ 46-101858

[52] U.S. Cl..................... 264/40, 264/89, 264/174, 264/236
[51] Int. Cl............................................. B29f 3/10
[58] Field of Search ....... 264/174, 40, 89, 236, 211, 264/25, 26

[56] References Cited
UNITED STATES PATENTS

| | | | |
|---|---|---|---|
| 3,054,142 | 9/1962 | Hinderer et al...................... | 264/174 |
| 3,064,073 | 11/1962 | Downing et al...................... | 264/174 |
| 3,527,851 | 9/1970 | Bulgin.................................. | 264/40 |
| 3,544,665 | 12/1970 | Bowers................................ | 264/174 |

*Primary Examiner*—Jeffery R. Thurlow
*Attorney, Agent, or Firm*—Armstrong, Nikaido & Wegner

[57] ABSTRACT

In the production of cables covered with a crosslinked material by feeding a conductor and a crosslinkable material covering the conductor through a long land portion of an extruding die unit, the length and the operational temperature in the land portion being selected so that the cross-linking reaction is substantially completed within the land portion, and cooling the cross-linked material within a cooling device housing a pressurized cooling fluid therein, an improved process within the aforementioned feeding of the conductor is carried out under a braking force counteracting a pull generated along the cable by the pressurized cooling fluid.

5 Claims, 9 Drawing Figures

PRODUCTION OF ELECTRICAL CONDUCTORS COVERED WITH CROSSLINKED MATERIAL

BACKGROUND OF THE INVENTION

Field of the Invention

This invention relates to processes for producing electrically insulated conductors including insulated wires and cables (hereinafter referred to collectively as "cables") from conductors and insulating materials of cross-linkable nature.

Heretofore, an extruded product made of a material which is to be cross-linked or vulcanized by heating or any other polymerizing procedure such as the use of a catalyst, has been produced in two steps by first extruding the material into a desired form and then cross-linking the thus extruded material as shown in U.S. Pat. No. 3,054,142. However, since such a process seems to have some difficulties in application to an actual manufacturing plant, an improved process as disclosed in the pending Japanese Pat. No. 46660/1971 and U.S. Ser. No. 212,049 now abandoned filed Dec. 27, 1971, and West German Application DOS No. 2,164,560 filed July 29, 1972 by Masaru Fuwa, Kiyoshi Takahashi, Masaaki Otsuji, and Masatake Matsui entitled METHOD FOR FORMING AND VULCANIZING VULCANIZABLE MATERIALS AND ARTICLES VULCANIZED THEREBY has been proposed.

In this process, a cross-linkable material is continuously extruded through an elongated land portion of an extrusion die unit, the length of which is selected in such a manner that the crosslinking reaction of the material passing through the land portion can be substantially completed within the elongated land portion.

In such a process, the cross-linking reaction is often accompanied by the generation of gases due to the decomposition of a cross-linking agent and when the product is delivered from the elongated land portion of the extruding die unit, maintained at a high temperature and a high pressure, into an outside atmosphere, the gases contained in the product are liberated and expand to form bubbles in the product.

Since the generation of such bubbles is undesirable when the process is applied to the production of insulated cables, a pressurized cooling device housing a pressurized coolant therein is provided closely adjacent to the outlet end of the long land portion of the proposed process, so that the covered conductor thus extruded is cooled under a pressure sufficiently high to suppress the liberation of the gas in the insulating covering of the cable (as described in Japanese Pat. Nos. 103418/1970 and 121652/1970). The present invention relates to an improvement in such a process for producing insulated cables.

Problems in the Long-land Die Process

In the above described process, the feeding speed of the conductor is regulated, for instance, by a capstan, and the tension to which the conductor is subjected varies in accordance with the mutual relationship between the quantitative rate of extrusion of the insulating material and the feeding speed of the conductor.

On one hand, we have discovered that, in the case of the above described process, a pulling force is generated by the pressurized fluid in the cooling device, and, accordingly, it is necessary to give a additional braking force to act on the conductor.

Thus, in the above described process, complex forces act on the conductor, and unless the operational conditions are suitably selected, the quality of product becomes inferior and in the extreme case production itself becomes extremely difficult or impossible, because of a sudden occurrence of deformation and expansion of the insulating covering into a circumferentially pleated or furrowed state whereby it cannot pass through outlet seal part of the pressurized cooling device, or because of a occurrence of too thin insulating covering whereby the pressurized cooling fluid invade or flood into a curing die. As a result, stable operation becomes impossible.

Such a phenomenon has not been experienced in any of the long-land die processes for producing insulated cables, and has been newly found in the process wherein the extrusion and the cross-linking of the insulating material are carried out simultaneously in a long land portion of a die unit, and the resulting product is cooled in a pressurized cooling device provided closely adjacent to the land portion of the die.

We have studied this phenomenon intensively and have found that the reason therefor resides in an irregular pulling force exerted on the conductor by the pressurized fluid in the pressurized cooling device, such a problem of the production process constituting a formidable difficulty which is seemingly almost unsurmountable.

SUMMARY OF THE INVENTION

Therefore, an object of the present invention is to provide an improved process for producing insulated cables wherein the above described difficulty in the long-land die processes can be substantially overcome.

More specifically, an object of the present invention is to provide an improved process for producing insulated cables wherein the feeding speed of the conductor through a long land portion of the extrusion die is stabilized regardless of the pressure in the pressurized cooling device.

Still another object of the invention is to provide an improved process for producing insulated cables employing a long-land extrusion die and a pressurized cooling device provided closely adjacent thereafter, wherein any irregularity generated by the pulling force of the conductor caused by the pressurized cooling fluid is cancelled and the production of the cables is thereby stabilized.

These and other objects of the present invention can be achieved by an improved process for producing cables covered by a crosslinked material, wherein a conductor and a cross-linkable material for covering the conductor are fed through a long-land portion of an extruding die, the length and the temperature of which are so selected that the cross-linking reaction of the insulating material is substantially completed within the land portion, and the covered cable thus extruded and cross-linked in the elongated land portion of the die unit is thereafter cooled in a cooling device provided just after the long-land portion and housing a pressurized cooling fluid, which process, further comprises the step of applying a braking force resisting or counteracting a pulling force caused along the conductor by the pressurized cooling fluid, while the cable is passing through the cooling device.

More specifically these and other objects of the present invention can be achieved by an improved process for producing cables as set forth above, wherein said braking force T[kg] is determined from the relationship.

$$\pi(D_o^2-d^2)/4 \cdot\cdot P + T_{min} < T < \pi(D_o^2-d^2)/4 \cdot P + T_{max}$$

wherein: $D_o$ [cm] is the inner diameter of the delivering end of the land portion; $D$ [cm] is the delivered outer diameter of the material covering the conductor; $d$ [cm] is the outer diameter of the conductor; $P$ [kg/cm$^2$] is the pressure of said cooling fluid: $T_{min}$ [kg] is the braking force in the case where $D= 0.95$ $D_0 + 0.05$ $d$; and $T_{max}$ [kg] is the braking force in the case where $D = 1.2D_0 - 0.2d$.

The nature, principle, and utility of the present invention will be more clearly understood from the following detailed description of the invention when read in conjunction with the accompanying drawings wherein like parts are designated by like reference numerals.

DETAILED DESCRIPTION OF THE INVENTION

Figure 1:
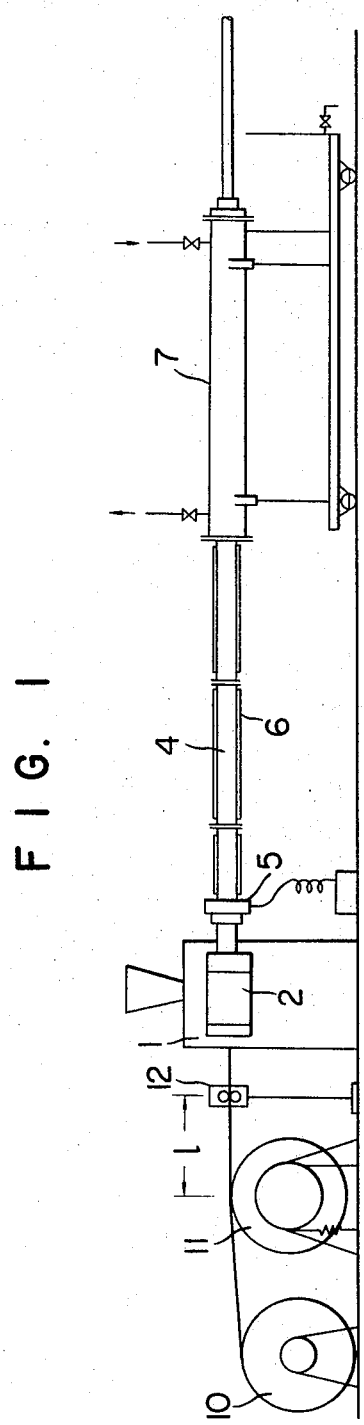
FIG. 1 is a diagrammatic side elevation showing an example of a cable producing apparatus for practicing the process according to the present invention.

Referring first to FIG. 1 diagrammatically showing an example of an apparatus for producing cables covered by a cross-linked insulation, there is indicated an extruder 1 wherein the covering material to be cross-linked (sometimes hereinafter simply called a cross-linkable resins although it includes elastomers), which is cross-linked under heat preferably with the aid of an added organic peroxide, is first plasticated at a temperature substantially not causing any cross-linking reaction, and the resin thus plasticated is thereafter supplied into a crosshead 2.

In the crosshead 2, the resin in semi-liquid condition is extruded and forced to cover a conductor 3 of the cable, which is supplied into the crosshead 2 from a conductor-supply reel 10 via a braking device 11 (by which a braking force T described hereinafter is applied to the conductor) and guide rolls 12. The conductor 3 thus covered by the resin is then passed through a long-land portion 4 of a die unit, lubricated by a lubricant as shown in Japanese Pat. No. 46660/1971 and the corresponding U.S. Application referred to hereinabove of, for instance, a surfactant introduced under pressure through an additive inlet port 5, and heated by a heater 6 provided outside of the land portion 4. The resin covering the conductor 3 is thus cross-linked in its entirety while the conductor 3 covered with the cross-linkable material travels through the long-land portion 4.

The cross-linkable material which covers conductor 3 thus cross-linked is thereafter introduced into a pressurized cooling device housing 7 directly coupled to the downstream end of the long-land portion 4 by means of flanges or the like. In the cooling housing 7, cross-linked material which covers the conductor 3 is cooled to a temperature which will not create bubbles therein because of the solidification of the cross-linked material by a cooling fluid, such as water, preferably circulating through the cooling housing, and maintained at a predetermined pressure by means of, for instance, a turbine pump (not shown). The resin-covered conductor thus completed into a cable is thereafter wound around a cable winding drum (not shown).

Generation of Pulling Force

As a result of our study, we have found that the irregular pull exerted on the covered conductor is generated by the pressurized fluid flowing around the covered conductor housed in the pressurized cooling device.

Figure 5:
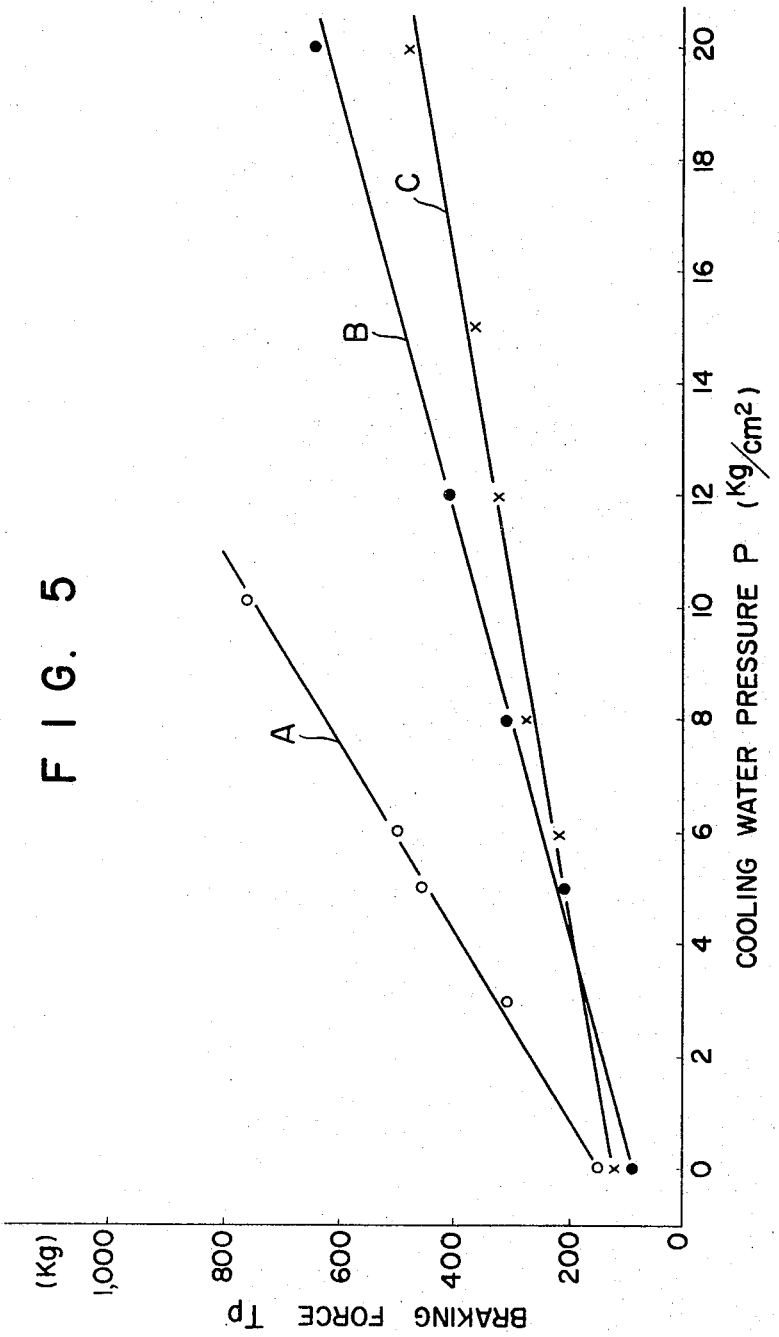
FIG. 5 is a graphical representation of a relationship between the braking force and the pressure of the pressurized fluid in the cooling device.

Referring now to FIG. 5, there are indicated relationships between the required braking force and the pressure of the coolant in the cooling device, under the condition where the rate of supply of the resin and the outer diameter of the covered cable just after the delivery D of the cable are both maintained constant. The lines A, B, and C represent braking forces required versus the cooling liquid pressure when cables as specified in the following Table are extruded respectively through land portions of inner diameters also set forth in the same Table.

| Line | i.d. of land-portion (mm) | o.d. of conductor (mm) | Thickness just after delivery of insulating layer (mm) | Sectional area of insulating layer (cm$^2$) | Remarks |
|---|---|---|---|---|---|
| A | 89 | 19 | 35 | 59 | 275 KV(200mm$^2$) |
| B | 67 | 34 | 16.5 | 26 | 66 KV(600mm$^2$) |
| C | 49 | 15.5 | 16.7 | 17 | 66 KV(100mm$^2$) |

As will be apparent from FIG. 5, the braking force required for obtaining stable extrusion and cooling of a cable as defined above varies in proportion to the variation in the pressure of the cooling liquid of the cooling device.

According to out study, a braking force T to be exerted on the conductor can be divided into two parts, one consisting of a component $T_1$ required for compensating for the pulling force caused by the pressurized cooling water and another component $T_o$ which is a constant to obtain a covered cable of outer diameter D which depends on the diameter $D_o$ of the end portion of a die and the thickness t of the cross-linked insulation cover. In other words, the required braking force T can be expressed as follows as described in more detail with reference to FIG. 5.

$$T = \pi (D_o{}^2 - d^2)/4 \cdot P + T_o$$

wherein:

P is the pressure of the coolant housed in the cooling device [kg/cm$^2$];

$D_o$ is the inner diameter of the die end [cm]; and $T_o$ is a component of the braking force [kg] for providing a covered cable of an outer diameter D [cm].

Thus, first of all, we have found that, in a process for producing cables covered with a cross-linked material comprising feeding a conductor and a cross-linkable material to cover the conductor through a long-land portion of an extruding die unit, the length and the operational temperature of said land portion being so selected that the cross-linking reaction of said material is substantially completed within the land portion, and cooling the conductor with the covering material thus cross-linked delivered from the long-land portion under a heated and pressurized condition by placing said material in contact with a pressurized cooling fluid in a cooling device, said feeding of the conductor of the cable is to be carried out under application of a braking force counteracting a pulling force caused on the cable by the pressurized cooling fluid during the cooling.

Figure 2:
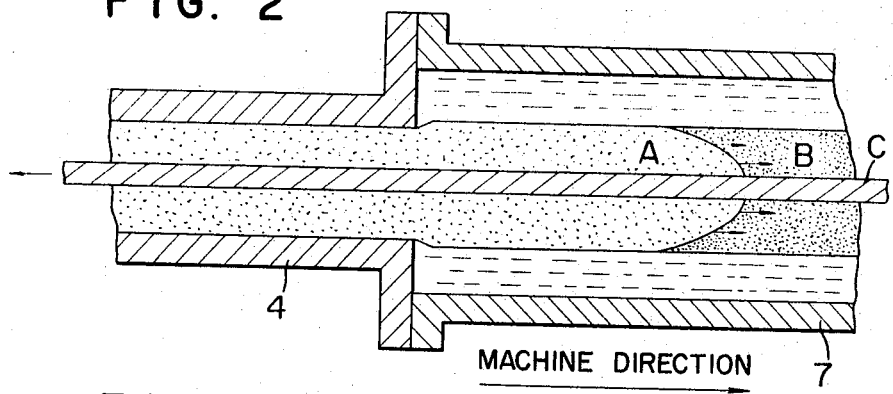
FIGS. 2 through 4 are longitudinal sections of the connection portion of a long-land die and cooling device, showing various states of a cross-linked material on the conductor, which is delivered from a long land portion of an extrusion die and is entering into a cooling device housing a pressurized cooling fluid.

The mechanism of generating the irregular pull will be explained with reference to FIG. 2. The covered conductor extruded and cross-linked in insulation covering within the land portion 4 in FIG. 2 is cooled in the pressurized cooling device 7, wherein the cooling is accomplished from the outer surface of the resin-covered conductor, so that the resin cover is divided into a part A wherein the resin has not yet solidified and can be considered as a fluid, and a part B wherein the resin has solidified so that it can be considered as a rigid body adhering to the conductor C.

Accordingly, the pressure applied to the cooling water is transmitted to the portion A still in the fluid state of the resin. The pressure transmitted to the fluid portion A creates an external force acting oppositely to the feeding direction of the conductor C and another external force applied along the feeding direction of the conductor C. The first external force may be compensated for by the extruding force from the extruder or may act as a resistive force for increasing the extrusion resistance.

The latter external force, however, acts on the boundary surface between the portions A and B in the arrow-marked direction, whereby the resin-covered conductor is urged in the feeding direction of the conductor C by this pulling force. This pulling force must be compensated for by an application of a braking force of a suitable magnitude.

That is, the component $T_o$ varies depending on the maximum delivered outer diameter D of the cable. More specifically, in the present invention it is essential that the required braking force T to be applied to the conductor should satisfy the following relation:

$$\pi(D_o{}^2-d^2)/4 \, P + T_{min} < T < \pi(D_o{}^2-d^2)/4 \, P + T_{max}$$

(I)

wherein: $T_{min}$ is a braking force in the case where a relation:

$$D = 0.95 \, D_o + 0.05d$$

(II)

or preferably $$D = D_o$$

(IIa)

is satisfied, and $T_{max}$ is a braking force in the case where a relation:

$$D = 1.2 \, D_o - 0.2 \, d$$

(III)

is satisfied.

When the length of the die becomes longer, the pressurized water will less flood into the die, especially into zones where the cross-linking has not been occurred, even when the braking force is smaller, and D will not become much larger even when the braking force is larger. Especially, when a die of the length of 5 to 50 m is used, $T_{min}$ and $T_{max}$ are realized when the following relationships are established:

$T_{min}$: $D = 0.97 \, D_o + 0.03d$, $T_{max}$: $D = 1.15 \, D_o - 0.15 \, d$.

$T_{max}$ and $T_{min}$ can be determined as actual T's for the maximum T and the minimum T, respectively, when the braking force is varied under the condition wherein no pressurized cooling is carried out. The range of the required braking force T under pressure P of the pressurized cooling is calculated for given $D_o$ and d in accordance with equation I.

In actual practice, there are several ways for determining T and P for given $D_o$ and d, and for desired D. In one way, one combination of desired D and T necessary therefor is selected by some preliminary experiments with no pressurized cooling, which T of course falls within the range of from $T_{min}$ to $T_{max}$ that has been determined as described hereinabove; and then the pressurized cooling is started by increasing the pressure P with increasing T for compensating the pulling force generated by the pressurized cooling until the pressure P has reached the desired level which is usually determined in view of suppression of bubble within the insulation. In another way, cable production is carried out with no or lower level pressurized cooling and with a final T which of course falls within the range calculated by the equation I for given $D_o$ and d, and $T_{max}$ and $T_{min}$ determined as described hereinabove; and then the cooling pressure is raised until it has matched the T. In the latter way, the D will not have the desired value until the cooling pressure has reached the final level. In these circumstances, the actual value of D is measured by such a direct means as a dial gauge or slide calipers when the cooling device has not been mounted at the exit of the die, and by such an indirect means as ultrasonic reflection when the cooling devie has been mounted.

Too Small a Braking Forde

Figure 3:
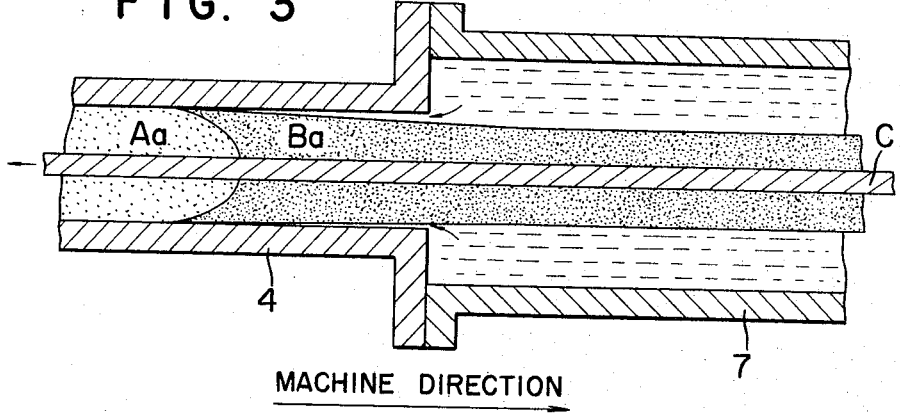

Should the braking force be excessively low, the component of the external force acting on the conductor cannot be compensated for, and the feeding speed of the conductor will be thereby accelerated. If the quantitative rate of supply of the insulating resin is constant, the resin cannot fill the entire space of the land portion, and a gap will be created between the outer surface of the product and the inner surface of the land portion, thus causing a flood or a backward flow of the cooling liquid into the land portion. Such a condition is diagrammatically indicated in FIG. 3.

The resin in the land portion is heated through the inner surface of the land portion, and a region A$a$ wherein the resin is not yet completely cross-linked and another region B$a$ wherein the resin is completely cross-linked are formed in the resin. When the reversed flow of the cooling liquid does not exceed the cross-linked region B$a$, the cooling liquid merely acts to somewhat roughen the surface of the product.

However, if the reversed flow of the liquid should reach the region A$a$, the cooling liquid suddenly intrudes into the region A$a$ because of the lower consistency of the region A$a$, and a part of the not yet cross-linked resin of a quantity corresponding to the intruding quantity of the cooling liquid is pushed out abruptly in the feeding direction of the conductor. This phenomenon, which is termed "push out" of the resin, prevents continuation of steady production of the resin covered cable.

Too Large a Braking Force

On the contrary, if an excessively large braking force is applied to the conductor, the delivering speed of the product will be reduced, and the pressure of the resin supplied into the land portion of the die will be elevated. When the resin-covered conductor under a high pressure is delivered into the cooling device of a comparatively lower pressure, a phenomenon termed "expansion" is thereby caused on the resin cover, whereby the outer diameter of the resin-covered conductor becomes greater than the inner diameter of the land portion (the other diameter of the product at this instant is represented by D).

Figure 4:
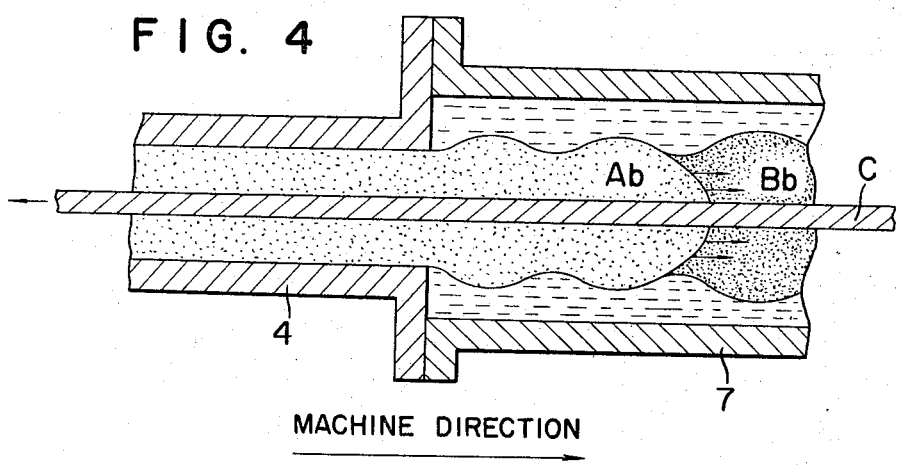

In the case where the braking force applied to the conductor is extremely great, the outer diameter of the product exceeds the extent of the expansion, and a constant diameter of the product cannot be maintained, thus causing a circumferentially pleated or furrowed surface configuration of the resin covering as shown in FIG. 4.

When the last mentioned phenomenon occurs, the production of the insulated cable is interrupted because the product cannot pass through the seal end of the pressurized cooling device. When the phenomenon is of a minor extent, a circumferentially pleated or a bellows-like surface of the product results although the production of the cable is not interrupted.

Figure 6:
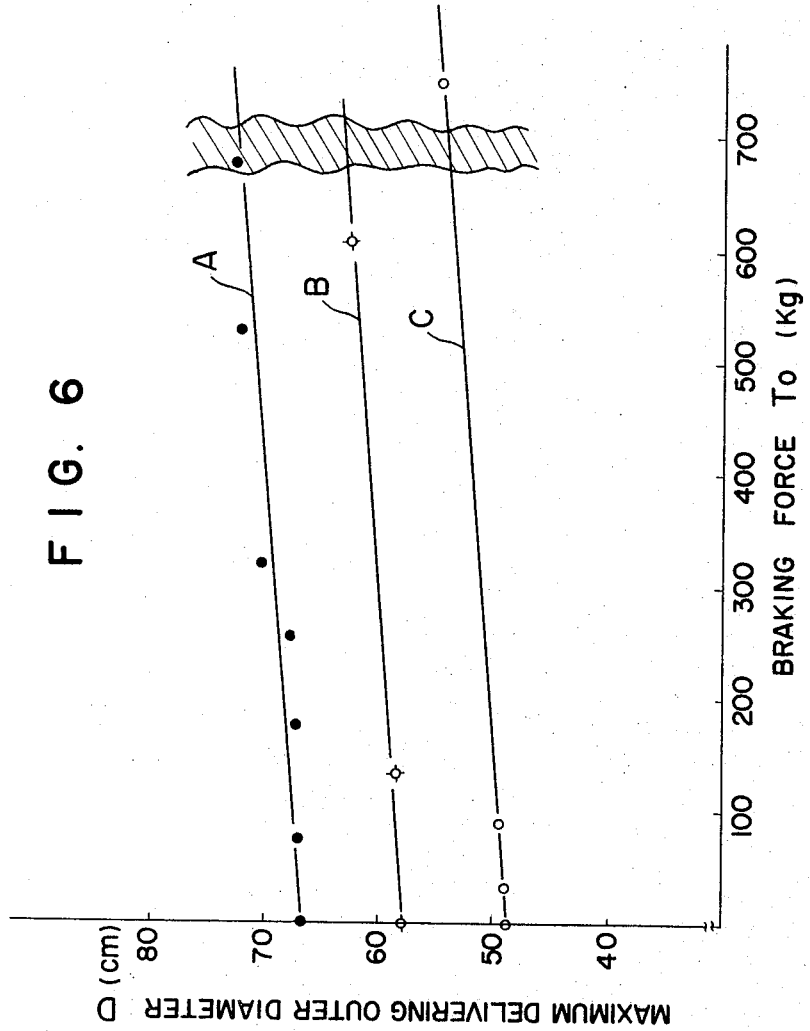
FIGS. 6 and 7 are graphical representations of relationships between the outer diameter of the covered cable just after the delivery from the die D and the braking $T_o$ under different conditions.

In FIG. 6, there are indicated relationships between the delivered outer diameters D and the braking forces $T_o$ for the cables A, B and C of 66 KV (600 mm$^2$), 66 KV (200 mm$^2$), and 66 KV (100 m$^2$), respectively. As will be described hereinafter, the relationship between the D and $T_o$ for these cables varies depending on the type of resin used therein. FIG. 6 indicates the results obtained for those cables made of a low-density polyethylene, manufactured by Mitsubishi Petrochemical Co., Ltd., (of a melt index MI 0.5 and number average molecular weight Mn 4 × 10$^4$), with the thickness $t$ of the cross-linked polyethylene cover being selected commonly at 16 mm. In FIG. 6, the shaded region indicates an area wherein an expansion phenomenon is caused in the outer diameter of the cable as will be described hereinafter.

Figure 7:
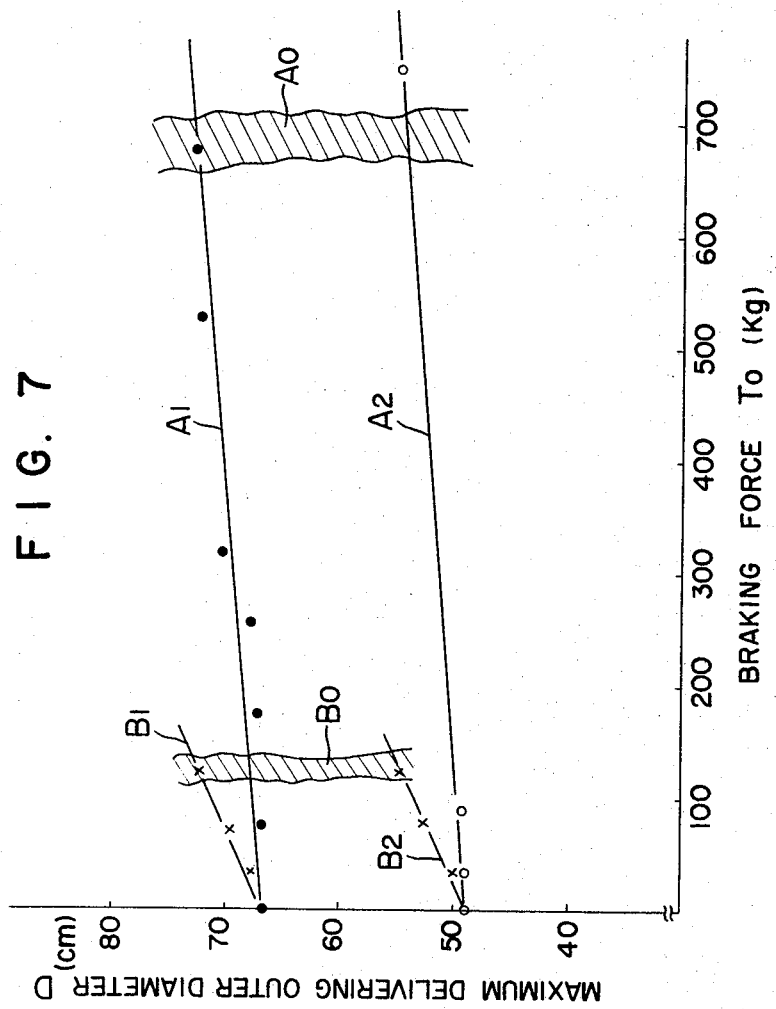

FIG. 7 indicates relationships between D and $T_o$ for the cables A$_1$ and A$_2$, wherein the cable A$_1$ is designed to have a nominal rated voltage of 77 KV and a cross-sectional area of the conductor of 600 mm$^2$, and the cable A$_2$ is designed to have the same rated voltage and a cross-sectional area of the conductor of 100 mm$^2$. For the insulating covers of these cables, two types of low-density polyethylenes A and B made by the Mitsubishi Petrochemical Co., Ltd., and having following features were used.

| Polyethylene | M.I. | Mn |
| --- | --- | --- |
| A | 0.5 | 4 × 10$^4$ |
| B | 2.0 | 3.4 × 10$^4$ |

The lines A$_1$, A$_2$, and the expansion causing limiting area A$_o$ are for the poylyethylene A, and the lines B$_1$, B$_2$, and the expansion causing limiting area B$_o$ are for the polyethylene B. From the graphical representations of FIG. 7, it will be apparent that the behaviors of the resin-covered conductors are different depending on the types of resins employed therein.

Measurement of Braking Force

Since the braking force can be regulated based on the measurement of D which is a cable diameter just after the delivery from the die, it is not necessary to determine the actual or absolute value of the braking force. It is possible, however, to determine the actual braking force. It is possible, however, to determine the actual braking force by means of known devices or methods such as a torque meter or strain gauge mounted on the driving axis of a braking device, a strain gauge, and a method resembling that for measuring tension in a string with fixed ends. The last mentioned method is preferable because it is simple and it will involve less errors, and is utilized in this invention.

The last-mentioned method is given in more detail:

In the apparatus arrangement of FIG. 1 wherein the conductor of a cable is fed at a constant speed, a braking force is applied to the conductor through a drum of the braking device 11. Assuming that there is no slip between the conductor and the brake drum, the section of the conductor extending between the braking drum and the guide rolls 12 may be considered to be a string both ends of which are fixed.

Accordingly, if a weight is suspended from the center of the conductor section supported at both ends, the tension applied to the conductor, i.e., the braking force, can be determined from the resulting deflection of the conductor. By denoting the distance between the two supporting points as $l$ [cm], the weight of the pendulum as F [kg], and the deflection of the conductor as $d$ [cm], and neglecting the deflection angle of the conductor because it is very small, the tension or braking force T [kg] applied to the conductor can be expressed as follows.

$$T = F/4 \cdot l/d$$

Result

From the above discussion, for a given extruder equipped with a die comprising a long land and a pressurized cooling device coupled thereto, namely, for given D$_o$, $d$, and P, control of braking force T will assure the stable operation.

A cable should have a thickness of the insulating resin cover in correspondence to the rated voltage, whereby the outer diameter of the cable is determined when the size of the conductor is determined. This outer diameter is obtained when the hereinbefore described delivered outer diameter of the resin-covered conductor is cooled and somewhat shrunken to the finished outer diameter $D_f$.

Device for Supplying Cross-Linkable Material

Usually, screw extruders are employed as an extrusion means.

Another example of the extrusion process to which the present invention is applicable is disclosed in Dutch Pat. No. 6,703,789. In this process, a thermoplastic resin mixed with a cross-linking agent is instantaneously compressed at a high pressure of more than 2,000 [atms], under conditions not causing any cross-linking reaction, and then subjected to a suitable production step such as extrusion for obtaining a desired product. During the initial part of the extrusion step in this case, the thermoplastic resin may not necessarily be plasticated completely.

Long Land Die Extruder

The extrusion and cross-linking of the resin-covered conductor are carried out in the long land portion of the die unit having such a length and operated at such a temperature that the cross-linking of the resin cover is substantially completed while it is traveling through the long land portion. According to the present invention, the delivering end of the land portion is directly coupled to the pressurized cooling device as disclosed in the Japanese Pat. Nos. 103418/1970 and 121652/1970.

Although the length of the land portion is determined in the manner described above, the value thereof may be varied in a wide range. For instance, the value is sometimes selected to be more than 5 meters, depending on the type of the cross-linking (or linked) material, feeding rate of the conductor, and the temperature within the land portion, and in some extreme cases, the length of the land portion is 50 meters.

The land portion of the die unit is heated by any suitable means, preferably of electrically controlled means. From the viewpoint of accelerating the cross-linking reaction, the temperature of the land portion should preferably be selected as high as possible. However, when it is considered from the viewpoint of preventing degradation of the cross-linking material, a temperature lower than 300°C is preferred for polyolefin resins. Of course, the temperature in the land portion need not be constant, but may vary along the length of the land portion. Furthermore, a cooling zone may be provided integrally in the land portion itself so that a partially cooled product can be obtained directly from the delivery end of the land portion.

Figure 9:
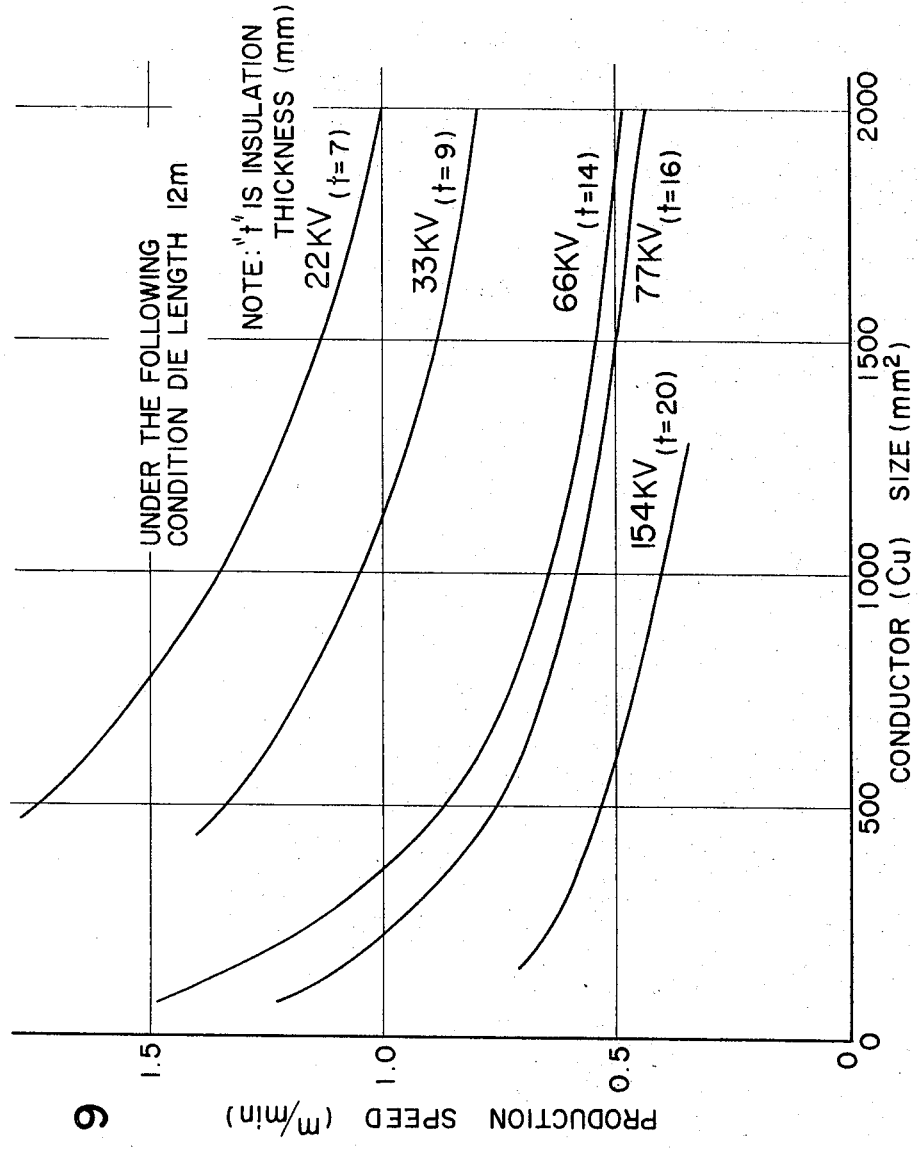
FIG. 9 is a graphical representation of a relationship between insulation covering thickness and residence time within the die.

As an example, a cable is produced wherein a polyolefin covering a conductor and containing a conventional cross-linking gent such as dicumyl peroxide (decomposition temperature 171°C), di-tert.-butyl peroxide (decomp. temp. 186°C), or tert.-butyl peroxide (decomp. temp. 176°C) is extruded and cross-linked through a longland die of 14 m. length at a residence time within the die as shown in FIG. 9. The residence time can be shortened or the extrusion rate can be increased by preheating the conductor. Longer the length or higher die temperature will of course lead to increased extrusion rate.

Since the land portion of the die unit is of a considerable length as described above, and the resin cover passing through the land portion will soon lose its fluidity to a substantial degree, a mightier feeding mechanism than the conventional mechanism used with shorter land portions would be required for feeding the resin covered conductor through the long land portion.

The above-mentioned requirement of mighty feeding mechanism can be substantially eliminated if a suitable lubricating agent is introduced into the land portion. Furthermore, although in the above described example, the resin material fed into the die unit has been described as being sufficiently plasticated, a partly plasticated resin material may also be used in the land portion if necessary.

Pressurized Cooling Device

According to the present invention, a cooling device housing a pressurized fluid is provided at the delivery end of the land portion of the die unit thereby to cool the product delivered from the land portion under a pressurized condition. The cooling fluid may be in the form of a gas or a liquid. However, in ordinary cases, a liquid coolant is preferable. The cooling liquid may contain any kind of solid particles.

For the liquid coolant, organic liquids may be employed. However, the most commonly used is water; the water can not only be pure but also contain soluble materials or non-soluble materials dissolved or dispersed therein, or can be in emulsion.

The pressure applied to the cooling liquid may be selected to be as high as possible from the viewpoint of suppressing creation of bubbles. However, in ordinary cases, the pressure need not be higher than the pressure applied to the product while it is extruded through the elongated land portion of the die unit.

Practically, the pressure of the cooling fluid is selected in a range of from 1 to 30 $Kg/cm^2$ G, preferably 3 to 20 $Kg/cm^2$ G (gauge). Of course, this pressure may be varid depending on the viscosity or consistency of the resin at the extruding temperature or the fluidity of the resin. In the case where the product is specifically made of a cross-linking material of a high viscosity or where the product is maintained at a low temperature or in a highly cross-linked condition, however, the pressure of the cooling fluid may be selected at a comparatively low value.

In general, it is sufficient to cool the cable to a temperature of from 50° to 80°C. Accordingly, when a high-density polyethylene of a degree of crosslinking of about 98% is extruded at 250°C, the creation of bubbles can be effectively suppressed by cooling the product to a temperature lower than 80°C under a pressure of about 10 $Kg/cm^2$, and when a low-density polyethylene with similar crosslinking is extruded at 250°C, the bubbles can be suppressed if it is cooled to a temperature lower than 70°C.

The temperature of the cooling fluid itself may be selected at a level whereby the above described cooling temperature of the product can be realized. It is also possible to provide a suitable temperature gradient or a temperature distribution along the longitudinal axis of the cooling device. Alternatively, the cooling device may be divided into a plurality of sections each cooled by a circulating cooling liquid of different temperature.

The cooling device for receiving and cooling the product delivered from the land portion of the die unit has generally a cylindrical shape of a cross-sectional area sufficient to house both the product and the cooling fluid, and an ample length to afford a residence time sufficient to remove a required amount of heat from the product. The cooling device, furthermore, should be so constructed that it comprises a sealing device at the delivery end thereof so that the pressurized fluid is thereby prevented from leaking out of the same end while the product is delivered through that end.

Although the cooling device is ordinarily directly mounted to the delivery end of the land portion of the die unit, the cooling device may be separated from the land portion, and another sealing device as described above may also be provided at the entrance end of the cooling device.

Braking Device

The braking device may be of any suitable construction capable of imparting a braking force of a magnitude sufficient to counteract the pull generated by the pressurized fluid in the cooling device. Among preferred examples of the braking device, there are a metering capstain type and a metering caterpillar type, both being capable of feeding the conductor at a predetermined rate with the simultaneous application of a braking force pneumatically or hydraulically, powder braking device, and band braking device type.

Cross-linkable Insulating Material

The cross-linkable material to be extruded in accordance with this invention has sometimes been called "resin" so far. However, it includes elastomer.

Such material can be of any type provided that it can be cross-linked under heat preferably by the use of a free radical initiater such as a peroxide.

Typical examples are combinations of polyolefin resins such as polyethylene, poly (ethylene-propylene), poly (ethylene-vinylacetate), and the like with a cross-linking agent of a perioxide type such as dicumyl peroxide, di-t-butyl peroxide, t-butylcumyl peroxide, or other type of cross-linking agent.

Another example of the cross-linkable material is natural or synthetic rubbers such as EPR (Ethylene-Propylene Rubber), EPT (Ethylene-Propylene terpolymer), butyl rubbers, silicone rubbers, chlorinated rubbers, urethan rubbers, Neoprene, NBR, SBR, fluorine-containing rubbers, and acrylate rubbers. Cross-linking agents for such rubbers are, for example, sulfur, tetramethyl thiuram disulfide, quinone dioxime, organic peroxides, diamino compounds and the like. The cross-linking agent may be of a type which in itself forms a cross-linking portion between the cross-linked polymer chains, or of another type which does not from any cross-linking portion.

Still another example of such a cross-linkable material is a unsaturated polyester resin, and another example thereof is a thermoplastic resin other than polyolefin blended with a cross-linking agent.

In addition, any type of resin which can be cross-linked by subjecting it to heat, such as methylolated acrylamide polymers, or carboxylic acid polymers blended with metal oxides, can be employed as the cross-linkable material. These cross-linkable materials may furthermore be employed in the form of mixtures and resins may be of an elastomeric nature to some extent. If required, these cross-linkable materials may contain various auxiliary materials such as fillers (consisting of an inorganic powder or wood flour), a foaming agent, a plasticizer, a stabilizer, pigments, and the like.

Conductor

Solid copper conductors or stranded conductors are most typical. However, so far as it does not contradict the concept of the present invention, aluminum conductors or others may also be used in the present invention.

EXAMPLES

Example 1

An apparatus as illustrated in FIG. 1 was used for producing a cable of a nominal rated voltage of 66 kV and a nominal cross-sectional area of the conductor of 100 mm². The land portion of the die unit was made to have an inner diameter of 49 mm and a length of 3 m. A low-density polyethylene (MI = 0.5 and Mn = about $4 \times 10^4$) produced by the Mitsubishi Petrochemical Co., Ltd. and made cross-linkable by an organic peroxide was employed as the covering material of the cable. The temperature in the land portion was kept at 250°C, and the extrusion rate in the land portion was so selected that the resin covered conductor would stay within the land portion for about 20 minutes.

1. When D was to be 4.86 cm ($T_o = 10$ kg):

The braking force was increased in correspondence to any increase in the water pressure in the cooling device, maintaining a relation of $T = \pi(D_o^2-d^2)/\pi \cdot P + T_o$ therebetween, whereupon stable production of a cable having a constant finished outer diameter $D_f = 45.6$ mm was thereby made possible.

2. When D was to be 5.1 cm ($T_o = 100$ kg):

The braking force was raised corresponding to an elevation in the water pressure in the colling device in accordance with the relationship of $T = \pi(D_o^2-d^2)/\pi \cdot P + T_o$, whereupon stable production of a cable having a constant finished outer diameter $D_f = 47$ mm was accomplished.

3. When D was to be 5.7 cm ($T_o = 600$ kg):

A circumferentially pleated configuration was formed on the cable, and the production of the cable was thereby interrupted.

Example 2

An experiment was carried out with merely the type of the covering material of the cable being changed to a low-density polyethylene (MI = 2.0 and Mn ≈ 3.4 × 10⁴) also produced by Mitsubishi Petrochemical Co., Ltd. and made cross-linkable by an organic peroxide.

1. When D was to be 5.6 cm ($T_o = 150$ kg):

When the braking force was varied, a circumferentially pleated configuration was caused on the cable, thus rendering the production of the cable entirely impossible.

2. When D was to be 5.2 cm ($T_o = 70$ kg):

When the water pressure in the cooling device was raised to 15 kg/cm², and the braking force T was set at 17 cm² × 15 kg/cm² + 70 kg = 325 kg, stable production with a constant outer diameter of the cable was attained.

3. When the braking force was lowered to 250 kg at the last stage of the experiment corresponding to the above described case (2), the pressurized cooling liquid flooded backward into the land portion 10 minutes thereafter, which was observed by the temperature drop of the die, and "pushing out" of the cable was thereby caused.

Example 3

A cable of 275 kV nominal dielectric strength and 200 mm² nominal cross-sectional area was produced in an apparatus as shown in FIG. 1. The covering material of the cable was the low-density polyethylene produced by Mitsubishi Petrochemical Co., Ltd., and a miner part of dicumyl peroxide was blended thereinto as a crosslinking agent. The length of the land portion of the die unit was 10m, and the inner diameter thereof was 89 mm. When $T_o$ was set at 100 Kg, a delivered diameter D of 90.5 mm was obtained, and stable production of the cable was achieved under a water pressure of 15 kg/cm² and a braking force $T_p$ of 59 cm² × 15 + 100 ≈ 985 kg.

When the braking force was raised to 1,035 kg so that a delivering diameter D of 91.5 mm was thereby obtained, it was possible to produce a cable product having a smooth surface in a stable manner for several hous under a pressure of the cooling liquid 15 kg/cm².

Example 4

The inner diameter of the land portion was determined as follows for a cable of a nominal rated voltage 66kV and a nominal cross sectional area of the conductor of 600 mm². In this case, the outer diameter $d$ of the conductor was 34 mm, the thickness $t$ of the cable covering was 16 mm, and the finished outer diameter $D_f$ of the cable was 66 mm.

Assuming that the average temperature of the resin covering the conductor traveling within the delivery end of the land portion of the die unit is 200°C (the temperature of the land portion is set at 250°C), the delivered diameter D of the cable can be calculated from the following equation under the assumption that the densities of the resin is 0.77 to 0.92 when the temperature is varied 200°C and a room temperature, respectively, and that any volumetric variation along the length $l$ of the cable is negligible.

$$\pi/4 \ (D^2 - d^2) \times l \times 0.77 = \pi/4 \ (D_f^2 - d^2) \times l \times 0.92$$

Substituting $D_f$ and $d$ in the Equation by the above indicated values, a delivered diameter D of about 71 mm is obtained. From this value, the inner diameter $D_o$ of the land portion can be calculated as follows.

$$D + 0.2d/1.2 < D_o < D$$

therefore $$\gamma < D_o < 71.2$$

The inner diameter of the delivery end of the land portion thus determined is 68 mm, and a cable having an outer diameter $D_f$ of 66mm can be continuously produced with an expansion factor $\alpha$ of 8.8 %.

Example 5

In the procedure of Example 4 described above, the polyethylene was changed to another low-density polyethylene (MI = 0.5) produced by Mitsubishi Petrochemical Co., Ltd.

Under the application of a constant braking force of 600 kg, a cable product of a delivered diameter D of 72.5 mm (before cooling) was obtained. Raising the pressure of the cooling water to 10 kg/cm², a product of a finished diameter $D_f$ of 65.3 mm was obtained in a stable manner.

According to the procedure described in Example 4, the delivered diameter D thus obtained was reduced under the cooling water pressure of 10 kg/cm² to 70 mm.

Figure 8:
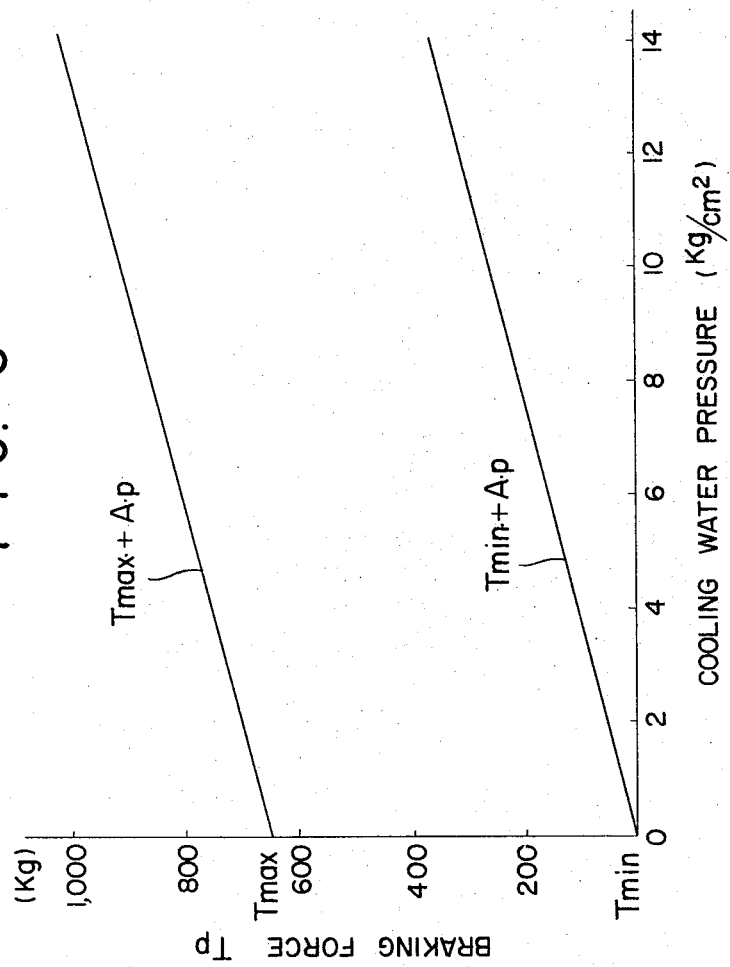
FIG. 8 is a graphical representation of a relationship between the braking force applied to the conductor and the pressure of the cooling water.

In other words, when $T_{min}$ and $T_{max}$ are determined from the curve $A_1$ in FIG. 7, and if it is found from FIG. 8 that the braking force T now obtained is in a range of $$A.P + T_{min} < T < A.P. + T_{max},$$ then stable production of the cable can be realized without changing the braking force in crorrespondence to the variation of the cooling water pressure.

Example 6:

An apparatus as illustrated in FIG. 1 was used for producing a cable of a nominal rated voltage of 22 kV and a nominal cross-sectional area of the conductor of 100 mm². The land portion of the die unit was made to have an inner diameter of 28.8 mm and a length of 15 m. A low-density polyethylene (MI = 2.0) was employed as the covering material of the cable. The temperature in the land portion was kept at 250°C, and the extrusion rate in the land portion was so selected that the resin covered conductor would stay within the land portion for about 5 minutes.

1. When D was to be 2.95 cm (To = 70 kg):
When the water pressure in the cooling device was raised to 10 kg/cm², and the braking force T was set at 4.93 cm² × 10 kg/cm² + 70 kg = 119.3 kg, stable production with a constant outer diameter of the cable was attained.

2. when D was to be 3.20 cm (T $_o$ = 150 kg):
A circumferentially pleated configuration was formed on the cable due to excessive expansion, and the production of the cable was thereby interrupted.

3. In the run (1) hereinabove, the braking force was reduced to 45 kg at the end of the run, the pressurized cooling water flooded into the land 5 minutes after the reduction of braking force, which was ascertained by sudden temperature drop in the die, and push out of the covered cable was caused 3 minutes after the flooding.

Example 7

An apparatus as illustrated in FIG. 1 was used for producing a cable of a nominal rated voltage of 154 kV and a nominal cross-sectional area of the conductor of 1,000 mm². The land portion of the die unit was made to have an inner diameter of 86.5 mm and a length of 15 m. A low-density polyethylene (MI = 2.0) was employed as the covering material of the cable. The temperature in the land portion was kept at 250°C, and the extrusion rate in the land portion was so selected that the resin covered conductor would stay within the land portion for about 35 minutes.

1. When D was to be 9.0 cm ($T_o$ = 80 kg):
When the water pressure in the cooling device was raised to 10 kg/cm², and the braking force T was set at 46 cm² × 10 kg/cm² + 80 kg = 540 kg, stable production with a constant outer diameter of the cable was attained.

2. When D was 9.8 cm ($T_o$ = 170 kg):
A circumferentially pleated configuration was formed on the cable, and the production of the cable was thereby interrupted.

3. In the run (1) hereinabove, the braking force was reduced to 450 kg at the end of the run, the pressurized cooling water flooded into the land 7 minutes after to reduction of braking force, and push out of the covered cable was caused 5 minutes after the flooding. The temperature at the end of the die was lowered by 10°C 7 minutes after the reduction of braking force.

Example 8

An apparatus as illustrated in FIG. 1 was used for producing a cable of a nominal rated voltage of 33 kV and a nominal cross-sectional area of the conductor of 1,500 mm². The land portion of the die unit was made to have an inner diameter of 70.0 mm and a length of 15 m. A low-density polyethylene (MI = 2.0) was employed as the covering material of the cable. The temperature in the land portion was kept at 250°C, and the extrusion rate in the land portion was so selected that the resin covered conductor would stay within the land portion for about 20 minutes.

1. When D was to be 7.2 cm ($T_o = 80$ kg):

When the water pressure in the cooling device was raised to 10 kg/cm², and the braking force T was set at 25.3 cm² × 10 kg/cm² + 80 kg = 333 kg, stable production with a constant outer diameter of the cable was attained.

2. When D was to be 7.5 cm (T = 170 kg):

A circumferentially pleated configuration was formed on the cable, and the production of the cable was thereby interrupted.

3. In the run (1) hereinabove, the braking force was reduced to 250 kg at the end of the run, the pressurized cooling water flooded into the die 2 minutes after the reduction of braking force and push out was caused 1 minute after the flooding. The temperature at the end of the die was lowered by 12°C 2 minutes after the reduction of braking force.

We claim:

1. In a process for producing a cable covered with a cross-linked material, comprising extruding a cross-linkable material onto a conductor which is continuously passed through a long-land portion of an extruding die unit and subsequently through a cooling device directly connected to the exit of said extruding die unit, forming and vulcanizing said cross-linkable material through said long-land portion, and cooling said vulcanized material on said conductor by pressurized cooling fluid under a pressure P of 1-30 Kg/cm² in said cooling device, which pressure exerts an irregular pulling force along the length of said cable the improvement comprising applying a braking force T(kg) to a portion of said conductor and in the direction opposite to the moving direction of said conductor prior to said conductor entering the extruder-crosshead; said braking force T being determined from the following relationship:

$$\pi(D_o^2 - d^2)/4 \cdot P + T_{min} < T < \pi(D_o^2 - d^2)/4 \cdot P + T_{max}$$

wherein $D_o$ (cm) is the inner diameter of the delivery end of the land portion; $D$ (cm) is the maximum delivered outer diameter of the material covering the conductor; $d$ (cm) is the outer diameter of the conductor; $p$ (kg/cm²) is the pressure of said cooling fluid; $T_{min}$ (kg) is the braking force in the case where $D = 0.95 D_o + 0.05 d$ and $P = 0$ and $T_{max}$ (kg) is the braking force in the case where $D = 1.2 D_o - 2 d$ and $P = 0$ whereby the irregularity of said pulling force is eliminated by the application of said braking force.

2. A process for producing cables as set forth in claim 1 wherein said braking force T [kg] is determined from the relationship:

$$\pi(D_o^2 - d^2)/4 \cdot P + T_{min} < T < \pi(D_o^2 - d^2)/4 \cdot P + T_{max}$$

wherein: $D_o$ [cm] is the inner diameter of the delivery end of the land portion; $D$ [cm] is the maximum delivered outer diameter of the material covering the conductor; $d$ [cm] is the outer diameter of the conductor; $P$ [kg/cm²] is the pressure of said cooling fluid; $T_{min}$ [kg] is the braking force in the case where $D = D_o$; and $T_{max}$ [ng] is the braking force in the case where $D = 1,2D_0 - - 0.2d$.

3. A process for producing cables as set forth in claim 1 wherein the length of the land is from 5 to 50 [m] and the $T_{min}$ [kg] is the braking force in the case where $D = 0.97 D_o + 0.03d$ and $T_{max}$ [kg] is the braking force in the case where $D = 1.15 D_o - 0.15d$.

4. A process for producing cables as set forth in claim 1 wherein the $P$ is from 3 to 20 [kg/cm²].

5. The process of claim 1 wherein the braking force $T$ is first determined to have a value in the range $T_{min} < T < T_{max}$ when there is no pressurized cooling and subsequently determined with pressurized cooling by increasing the pressure $P$.

* * * * *

UNITED STATES PATENT OFFICE
CERTIFICATE OF CORRECTION

Patent No. 3,868,436           Dated February 25, 1975

Inventor(s) Masaaki Ootsuji et al.

It is certified that error appears in the above-identified patent and that said Letters Patent are hereby corrected as shown below:

Col. 16, line 19 change "2d" to --0.2d--.

Signed and Sealed this second Day of March 1976

[SEAL]

Attest:

RUTH C. MASON
Attesting Officer

C. MARSHALL DANN
Commissioner of Patents and Trademarks